(12) United States Patent
Hunt et al.

(10) Patent No.: US 11,627,837 B2
(45) Date of Patent: Apr. 18, 2023

(54) KITCHEN APPLIANCE

(71) Applicant: KENWOOD LIMITED, Havant (GB)

(72) Inventors: Martin Hunt, Havant (GB); Mark Seidler, Havant (GB); Ben Woodling, Havant (GB)

(73) Assignee: KENWOOD LIMITED, Havant (GB)

( * ) Notice: Subject to any disclaimer, the term of this patent is extended or adjusted under 35 U.S.C. 154(b) by 447 days.

(21) Appl. No.: 16/079,578

(22) PCT Filed: Feb. 24, 2017

(86) PCT No.: PCT/GB2017/050503
§ 371 (c)(1),
(2) Date: Aug. 24, 2018

(87) PCT Pub. No.: WO2017/144914
PCT Pub. Date: Aug. 31, 2017

(65) Prior Publication Data
US 2019/0069726 A1    Mar. 7, 2019

(30) Foreign Application Priority Data
Feb. 25, 2016 (GB) ..................................... 1603316

(51) Int. Cl.
*A47J 43/07* (2006.01)
*A47J 37/10* (2006.01)
(Continued)

(52) U.S. Cl.
CPC ......... *A47J 43/0777* (2013.01); *A47J 27/004* (2013.01); *A47J 36/06* (2013.01);
(Continued)

(58) Field of Classification Search
CPC .......... A47J 27/004; A47J 36/06; A47J 36/10; A47J 37/101; A47J 43/07; A47J 43/0716; A47J 43/0777
(Continued)

(56) References Cited

U.S. PATENT DOCUMENTS 4,902,522 A * 2/1990 Rudibaugh .............. A23B 4/00
426/231
5,161,711 A    11/1992 Picozza et al.
(Continued)

FOREIGN PATENT DOCUMENTS

CN        1202808 A     12/1998
CN      200966553 Y     10/2007
(Continued)

OTHER PUBLICATIONS

International Search Report and Written Opinion issued in PCT/GB2017/050503, dated May 16, 2017; ISA/EP.
(Continued)

*Primary Examiner* — Jimmy Chou
*Assistant Examiner* — Ket D Dang
(74) *Attorney, Agent, or Firm* — Harness, Dickey & Pierce, P.L.C.

(57) ABSTRACT

A kitchen appliance a bowl; a lid arranged to be fitable to the bowl; a seal arranged to be fitted between the lid and the bowl when the lid is fitted to the bowl; and a safety device arranged to allow operation of the kitchen appliance only when both the lid is fitted to the bowl and the seal is fitted between the lid and the bowl.

11 Claims, 15 Drawing Sheets

(51) Int. Cl.
*A47J 27/00* (2006.01)
*A47J 36/06* (2006.01)
*A47J 36/10* (2006.01)

(52) U.S. Cl.
CPC ............. *A47J 36/10* (2013.01); *A47J 37/101* (2013.01); *A47J 43/07* (2013.01); *A47J 43/0716* (2013.01)

(58) Field of Classification Search
USPC ......... 99/337, 339, 340, 403, 410–418, 467, 99/451, DIG. 14; 126/369, 375, 377, 126/390; 206/541, 544, 545, 546, 549; 220/400, 411, 413, 408, 428, 522, 902, 220/912; 219/725–735
See application file for complete search history.

(56) References Cited

U.S. PATENT DOCUMENTS

| | | | |
|---|---|---|---|
| 5,442,998 A * | 8/1995 | Niese | A47J 27/0813 99/337 |
| 5,567,049 A | 10/1996 | Beaudet et al. | |
| 5,927,183 A * | 7/1999 | Lee | B65D 81/2038 99/337 |
| 6,877,633 B2 * | 4/2005 | Niese | A47J 27/08 220/315 |
| 7,338,001 B2 | 3/2008 | Galban et al. | |
| 2005/0132895 A1 * | 6/2005 | Seurat Guiochet | A47J 27/09 99/337 |
| 2006/0169812 A1 | 8/2006 | Galban et al. | |
| 2011/0011274 A1 * | 1/2011 | Thelen | A47J 27/09 99/337 |
| 2011/0284545 A1 | 11/2011 | Lundgreen et al. | |
| 2012/0024993 A1 | 2/2012 | Audette et al. | |
| 2013/0075505 A1 | 3/2013 | Fevre et al. | |
| 2013/0220764 A1 * | 8/2013 | Choi | A47J 43/0777 192/69.8 |
| 2015/0037480 A1 | 2/2015 | Carlson | |
| 2015/0136769 A1 | 5/2015 | Quinn et al. | |
| 2015/0313414 A1 | 11/2015 | Gerard et al. | |
| 2016/0278578 A1 * | 9/2016 | Shan | A47J 43/0722 |
| 2016/0287011 A1 * | 10/2016 | Deshayes | A47J 43/0772 |
| 2016/0324368 A1 | 11/2016 | Seidler et al. | |
| 2017/0079470 A1 * | 3/2017 | Lego | A47J 27/004 |
| 2017/0127871 A1 * | 5/2017 | Leung | A47J 27/04 |

FOREIGN PATENT DOCUMENTS

| | | |
|---|---|---|
| CN | 203828731 U | 9/2014 |
| CN | 104159484 A | 11/2014 |
| CN | 104188544 A | 12/2014 |
| CN | 106037440 A | 10/2016 |
| CN | 106461204 A | 2/2017 |
| EP | 1671566 A2 | 6/2006 |
| JP | 3208581 U | 1/2017 |
| KR | 101491420 B1 | 2/2015 |
| WO | WO-2015147520 A1 | 10/2015 |
| WO | WO-2016144711 A1 | 9/2016 |

OTHER PUBLICATIONS

GB Search Report of the Intellectual Property Office issued in Application No. GB1603316.9, claims 1-17, dated Jul. 27, 2016.
GB Search Report of the Intellectual Property Office issued in Application No. GB1603316.9, claims 18-21, dated Mar. 14, 2017.
GB Search Report of the Intellectual Property Office issued in Application No. GB1603316.9, claims 23-27 and 30, dated Mar. 14, 2017.
First Office Action regarding Chinese Patent Application No. 201780012393.X, dated Feb. 3, 2021.
Notification of the Third Office Action for corresponding Chinese Application No. 201780012393.X dated Jun. 1, 2022, with English translation (28 Pages).

* cited by examiner

KITCHEN APPLIANCE

CROSS-REFERENCE TO RELATED APPLICATIONS

This application is a 371 U.S. National Stage of International Application No. PCT/GB2017/050503, filed Feb. 24, 2017 and published in English as WO 2017/144914 A1 on Aug. 31, 2017. This application claims the benefit of Great Britain Application No. GB1603316.9, filed on Feb. 25, 2016. The disclosure of each of the above-identified applications is incorporated herein by reference.

This invention relates to a kitchen appliance, and in particular to a sealing arrangement for a kitchen appliance, including a lid assembly and a seal for such an appliance.

Kitchen appliances having a bowl with a lid have long been known. Such kitchen appliances may incorporate tools being located in the bowl and/or heating means being arranged to cook the contents of the bowl.

In the described kitchen appliances, it is advantageous that a seal is provided between the bowl and lid to prevent the ejection of liquid ingredients from the bowl. It is advantageous if the seal is removable, so as to allow it to be easily cleaned and replaced, if necessary.

Typically, kitchen appliances having a lid and a bowl are provided with an interlock mechanism such that the operation of any tools and/or heating means is prevented if the lid is not fitted to the bowl. Where a removable seal is provided, it may be possible to fit the lid to the bowl without the seal being present and engage the interlock mechanism, allowing the appliance to be activated while it is improperly sealed or not sealed at all.

According to an aspect of the invention, there is provided a kitchen appliance, comprising a bowl; a lid arranged to be fitable to the bowl; a seal arranged to be fitted between the lid and the bowl when the lid is fitted to the bowl; and a safety device arranged to allow operation of the kitchen appliance only when both the lid is fitted to the bowl and the seal is fitted between the lid and the bowl.

Thus the kitchen appliance may not be operated without being sealed. The seal is preferably removable, such that the appliance still has the advantage that the seal can be removed for ease of cleaning.

Preferably, the lid has a locked position on the bowl, such as with a bayonet type fitting, and the safety device may be arranged such that the lid is movable into the locked position only when the seal is fitted between the bowl and the lid. This prevents the lid being fitted without the seal, making the absence of the seal apparent to the user when they attempt to fit the lid without the seal.

The kitchen appliance may further comprise a base unit arranged to support the bowl. The safety device may comprise a switch provided in the base unit, wherein the actuation of the switch allows the operation of the kitchen appliance. Optionally, the safety device comprises a movable element biased towards a first position (for example a raised or projecting position) and movable towards a second position when the lid is fitted to the bowl and the seal is fitted between the bowl and the lid (for example by bearing against the seal). The switch may be actuable by movement of the movable element into the second position when the bowl is supported on the base, for example by the moveable member projecting into the base. This arrangement provides a simple safety interlock mechanism for detecting the presence of the lid and the seal and allowing the kitchen appliance to be operated.

The movable member may be arranged to be moved to an intermediate position between the first and second positions when the seal and the lid are placed against the bowl. The moveable member may be arranged to be moved further from the intermediate position to the second position when the lid is moved to the locked position, for example by being rotated. Advantageously, a two-part safety interlock mechanism is provided, in which the lid must be locked in order for the kitchen appliance to be operated.

Optionally, the moveable member may be an elongate member, which may be a single piece or a plurality of articulated pieces, mounted to the bowl and extending from a position at or adjacent the rim of the bowl to a position at or adjacent the base of the bowl. The member may be contained in a narrow housing on the outside of the bowl, thereby taking up only a small volume relative to the bowl.

Operation of the appliance may for example comprise heating the bowl and/or moving a tool within the bowl, or example mounted on a shaft extending from the base of the bowl. Advantageously, a broad range of processing operations may be performed on the contents of the bowl, any or all of which may be controlled by the safety device.

Optionally, the safety mechanism may comprise a wireless connection. Alternatively or in addition, the safety mechanism may comprise an electronic sensor arranged to detect whether that the removable seal is fitted between the lid and the bowl. Optionally, the electronic sensor comprises at least one of a radio-frequency sensor, a magnetically-actuated reed-switch, and/or electrical contacts for which the removable seal completes an electrical circuit. This arrangement may reduce the number of components provided in or on the bowl and may also allow for additional functionality, such as improved monitoring of the status of the safety mechanism. For example, the components of the appliance such as the base, bowl, lid and seal components may be provided with electronic tags such as RFID tags, from which the arrangement or orientation of the components may be apparent or readable.

The bowl may comprise a latching mechanism arranged to latch the bowl with the base unit, and the safety device may be arranged such that the appliance is operable only when the bowl is also latched to the base unit. Advantageously, the bowl is thereby firmly secured to the base unit during operation.

Optionally, the kitchen appliance may comprise a button arranged to release the bowl from the base unit when the button is depressed. The bowl may further comprise a handle, wherein the button is preferably located on the handle, for example on the underside thereof. This allows the bowl to be easily and conveniently released from the base unit.

The kitchen appliance also may comprise a display element such as a screen arranged to indicate the condition of the safety device. This allows a user to easily monitor the condition of the safely device, and may also provide other operating information.

Optionally, the kitchen appliance may comprise one or more sensors arranged to detect the condition of the safety device; and one or more transmitters arranged to transmit data relating to the condition of the safety device to an external server and/or user device. This allows a user to remotely monitor the condition of the safely device.

According to another aspect of the invention, there is provided a seal arranged to seal a bowl with a lid, comprising a ring shaped body having first and second projections extending away from the body at or adjacent each axial end thereof; wherein a profile defined by the first projection is thinner than a profile defined by the body and a profile defined by the second projection; and wherein the first projection is arranged to act as a sealing surface. Optionally, the profile of the first projection may be tapered, and the profile of the second projection may be as thick as or thicker than the profile of the body. This arrangement allows the second projection to be used as a member in a mechanism such as the safety device of this invention while the first projection acts as a sealing surface.

Preferably, the seal is made of food-safe and/or flexible material, such as one of: rubber, silicone rubber, synthetic rubber, or thermoplastic elastomer. Advantageously, this allows the seal to be safely used with food and allows it to stretch to fit onto the lid.

According to another aspect of the invention, there is provided a lid assembly for a bowl of a kitchen appliance, comprising an outer lid section comprising a peripheral wall; and an inner lid section comprising a peripheral wall containing a groove arranged to hold a seal; wherein the inner lid section is arranged to fit within the wall of the outer lid section; and wherein the walls of the outer lid section and inner lid section are arranged to receive a lip of a corresponding bowl of a kitchen appliance for bearing against the seal. This allows the seal to be enclosed within the lid assembly so as to allow it to seal with a lip of a bowl, while additionally the seal may be removable.

Optionally, the wall of the outer lid section may comprise a plurality of projections arranged to retain the inner lid section. This arrangement allows the lid assembly to be easily assembled and disassembled for cleaning using a snap-fit or a press-fit.

The outer lid section may be capable of rotating independently from the inner lid section. This allows the lid assembly to be locked to the bowl without substantial frictional resistance between the seal and the lip of the bowl.

Optionally, the wall of the outer lid section may comprise a plurality of tabs and/or ramp-shaped projections arranged to interact with corresponding features provided on the bowl of the kitchen appliance to secure the lid assembly to the bowl. This allows the lid assembly to be fitted to the bowl in a bayonet or similar fit, which may compress the seal as the lid assembly is fitted.

Preferably, the outer lid section and the inner lid section both comprise a central aperture, the aperture provided in the inner lid section preferably being smaller than the aperture provided in the outer lid section. This allows ingredients and tools including rotary tools to be inserted into the bowl without removing the lid assembly.

The invention extends to methods and/or apparatus substantially as herein described and/or as illustrated with reference to the accompanying drawings.

The invention extends to any novel aspects or features described and/or illustrated herein.

Any apparatus feature as described herein may also be provided as a method feature, and vice versa. As used herein, means plus function features may be expressed alternatively in terms of their corresponding structure, such as a suitably programmed processor and associated memory.

Any feature in one aspect of the invention may be applied to other aspects of the invention, in any appropriate combination. In particular, method aspects may be applied to apparatus aspects, and vice versa. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

In this specification the word 'or' can be interpreted in the exclusive or inclusive sense unless stated otherwise.

Furthermore, features implemented in hardware may generally be implemented in software, and vice versa. Any reference to software and hardware features herein should be construed accordingly.

Whilst the invention has been described in the field of domestic food processing and preparation machines, it can also be implemented in any field of use, where efficient, effective and convenient preparation and/or processing of material is desired, either on an industrial scale and/or in small amounts. The field of use includes the preparation and/or processing of: chemicals; pharmaceuticals; paints; building materials; clothing materials; agricultural and/or veterinary feeds and/or treatments, including fertilisers, grain and other agricultural and/or veterinary products; oils; fuels; dyes; cosmetics; plastics; tars; finishes; waxes; varnishes; beverages; medical and/or biological research materials; solders; alloys; effluent; and/or other substances, and any reference to "food" herein may be replaced by such working mediums. It will be appreciated that the processing of food may include the processing and/or blending of liquid items, and may also include the processing of solid food or ice items into a liquid form.

The invention described here may be used in any kitchen appliance and/or as a stand-alone device. This includes any domestic food-processing and/or preparation machine, including both top-driven machines (e.g. stand-mixers) and bottom-driven machines (e.g. blenders). It may be implemented in heated and/or cooled machines. It may be used in a machine that is built-in to a work-top or work surface, or in a stand-alone device. The invention can also be provided as a stand-alone device, whether motor-driven or manually powered.

Aspects and embodiments of the invention are set out in the appended claims. These and other aspects and embodiments of the invention are also described herein.

Embodiments will now be described, by way of example only and with reference to the accompanying drawings having like-reference numerals, in which:

FIG. 1b shows a perspective view of a bowl-lid assembly of the kitchen appliance of FIG. 1a;

FIG. 1c shows a perspective view of a base unit of the kitchen appliance of FIG. 1a;

Figure 1A:
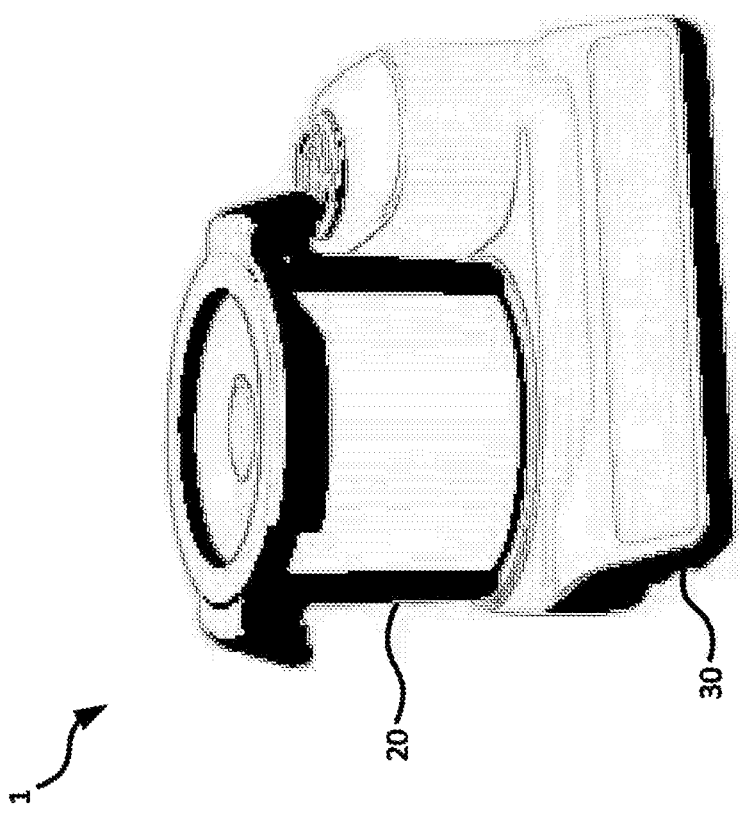
FIG. 1a shows a perspective view of a kitchen appliance according to the present invention.

Referring to FIG. 1a, the kitchen appliance 1 comprises a bowl-lid assembly 20 and a base unit 30. The bowl-lid assembly 20 typically houses a processing tool which may be powered and controlled by the base unit 30. Alternatively or in addition, the bowl-lid assembly 20 may be heated by the base unit 30. The bowl-lid assembly 20 is wholly removable from the base unit 30, allowing for easy cleaning, tool changes, and loading or removal of food items for processing.

Figure 1C:
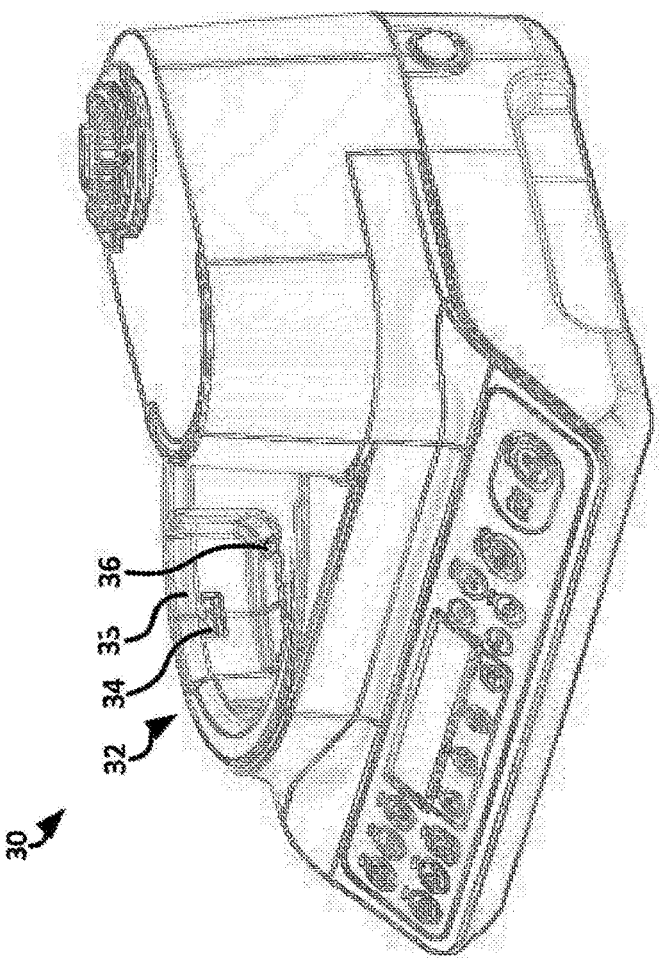
Figure 1B:
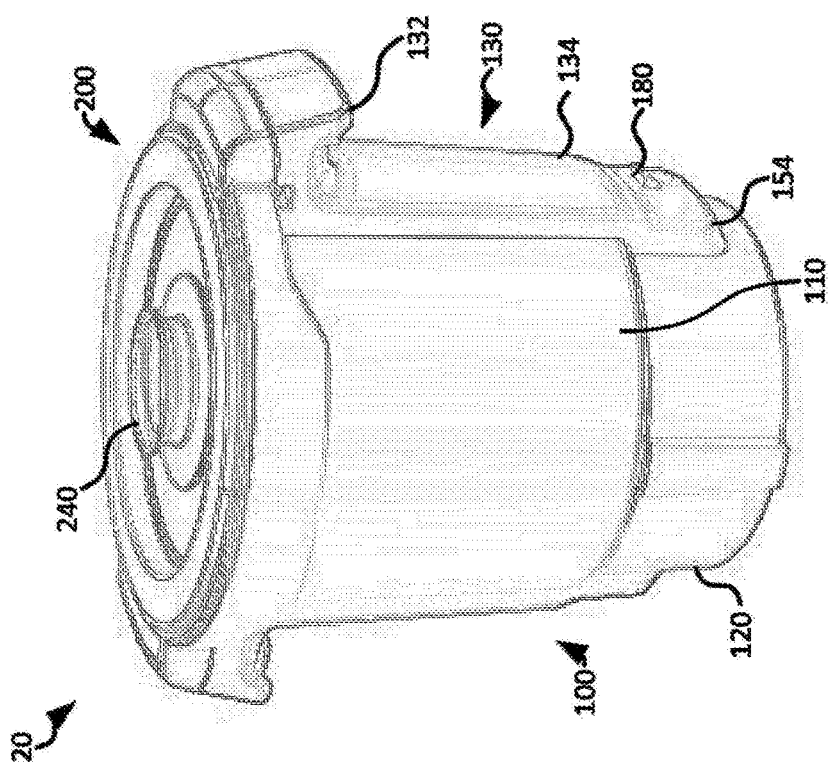

Referring to FIG. 1b, the bowl-lid assembly 20 comprises a bowl assembly 100 and a lid assembly 200. The lid assembly 200 is removable to allow the interior of the bowl assembly 100 to be assessed. The lid assembly 200 is arranged to form a seal with the bowl assembly 100 when fitted to prevent food items being ejected from the bowl assembly 100 during processing.

The bowl assembly 100 comprises a bowl 110 and a base section 120. The bowl 110 preferably has a circular cross-section, in order to promote the even heating or processing of food. The base section 120 preferably has a smaller diameter cross-section than that of the bowl 110.

The bowl assembly 100 further comprises a pair of handle assemblies 130 which provide a means to for a user to easily lift the bowl assembly 100 from above and in which several components are held. The handle assemblies 130 comprise a handhold 132 and a compartment 134 for holding components. The compartment 134 is located on the side of bowl and extends from a lip 112 of the bowl 110 onto the base section 120.

The compartment 134 preferably extends only a small way away from the side of the bowl 110 so as to preserve the broadly circular cross-section of the bowl 110. The shape of the compartment 134 may be arranged to curve at the interface between the bowl 110 and the base section 120 to match the smaller diameter of the base section 120. The handhold 132 is located towards the top of the compartment 134. The handhold 132 preferably extends outwardly and downwardly from the compartment 134 to allow the handhold 132 to be griped from underneath.

The compartment 134 comprises an outwardly-extending latch 180 located on the part of the compartment provided on the base section 120 for latching to the base unit 30. The compartment 134 further comprises an aperture 154 located on the underside of the compartment 134 to allow components contained within the compartment 134 to extend out of the compartment 134, as will be described later on.

FIG. 1c shows the base unit 30 of the kitchen appliance 1. The base unit 30 is capable of controlling and powering the bowl-lid assembly 20 using suitable integral processor, memory, and electronic communication means (either wired or wireless) for sending and receiving data to components of the kitchen appliance 1 and to external devices as well as the internet.

The base unit 30 comprises a cavity 32 arranged to receive a base section 120 of the lid-bowl assembly. The cavity 32 comprises a plurality of recesses 33 arranged to receive the part of the compartments 134 provided on the side of the base section 120. The recess 33 preferably comprises a further recess 34 for holding the latch 180 provided on the compartment 134. An aperture 36 containing a switch 38, such as a micro-switch, is provided within the recess 33 and is arranged so as to align with the aperture 154 provided on the underside of the compartment 134. The switch 38 is arranged to control the provision of power to a heating element and/or motor provided in the base assembly 100 or bowl/lid assembly 20, and/or the provision of power to any other component which may directly or indirectly damage the kitchen appliance 1 or cause harm to a user without a lid and/or seal being fitted to the bowl 110.

Figure 2:
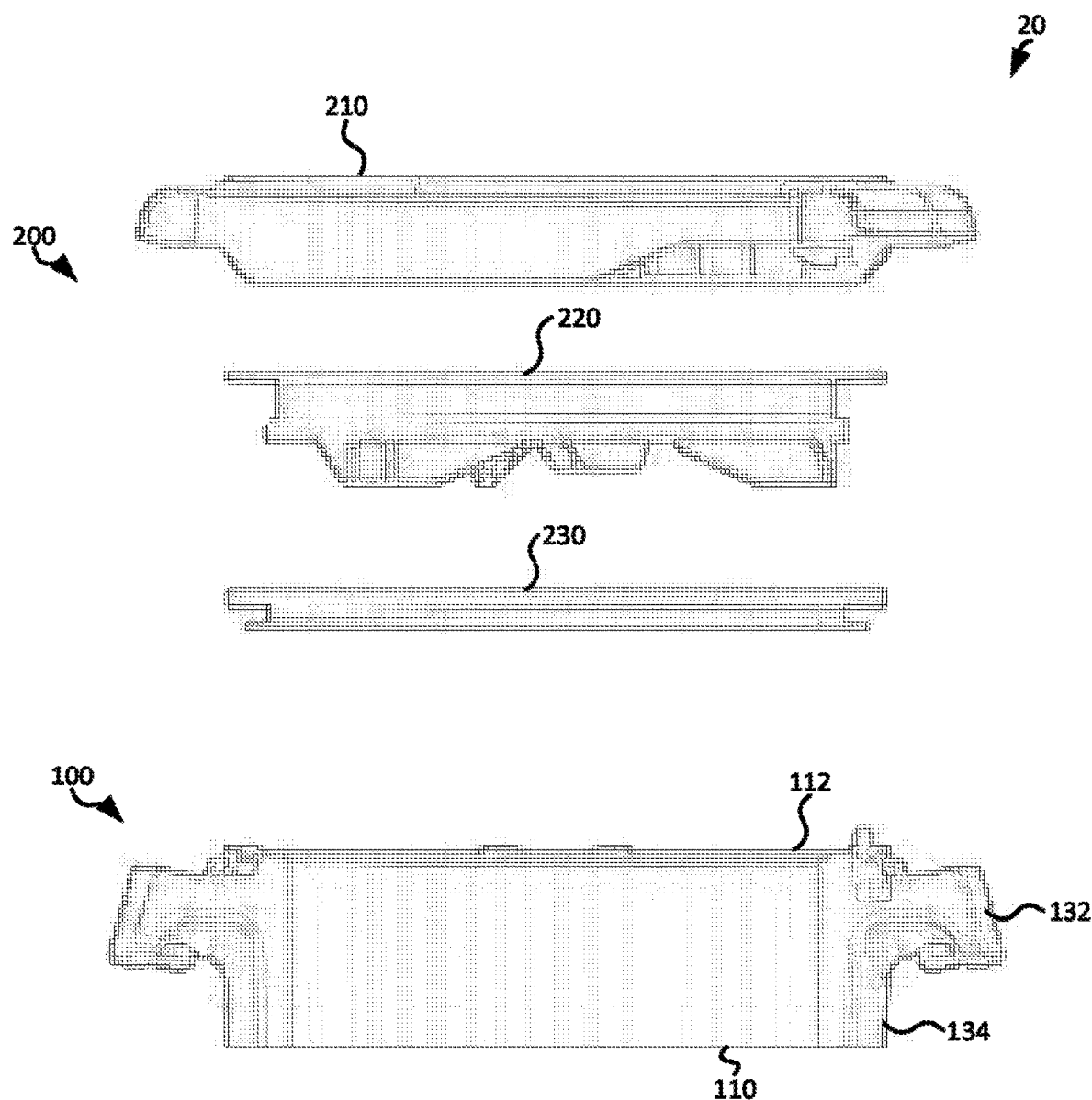
FIG. 2 shows a section of an exploded view of the bowl-lid assembly of FIG. 1b.

FIG. 2 shows a section of an exploded view of the bowl-lid assembly 20. As the Figure shows, the lid assembly 200 comprises an outer lid 210, an inner lid 220, and a seal 230. These components are arranged to be removable by a user for cleaning.

Figure 3:
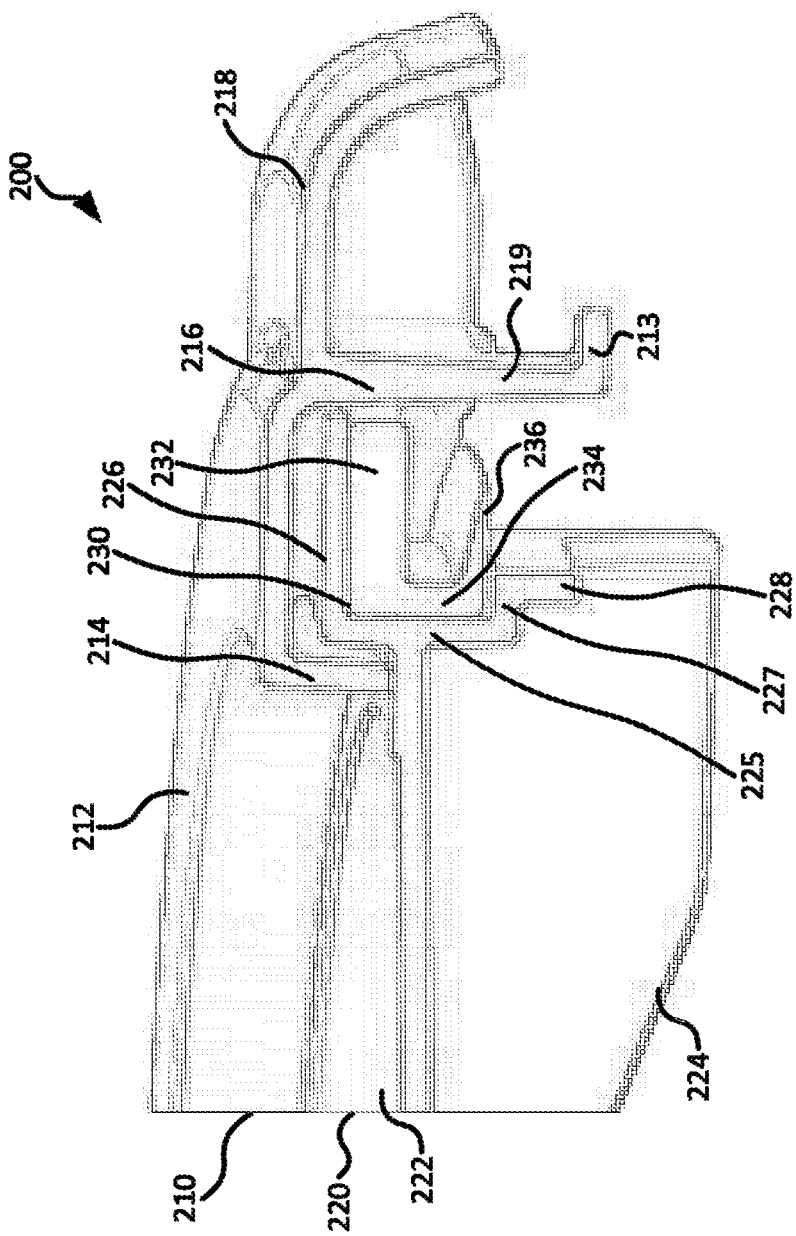
FIG. 3 shows a partial cross-section of an assembled lid assembly of the kitchen appliance.

FIG. 3 shows a partial cross-section of the assembled lid assembly 200, showing the fit between the components and the shape of the seal 230 in detail.

The seal 230 is a flexible ring-shaped seal which is arranged to fit around the inner lid 220 and seal against the lip 112. The outer lid 210 is arranged to hold the inner lid 220 and thereby the seal 230, leaving a gap open for the lip 112 of the bowl 110 to contact the seal 230.

The seal 230 has a distinct profile which allows it to operate effectively in the system of the present invention. The seal 230 comprises an upper part 232, a connecting part 234, and a lower part 236. The upper and lower parts 232, 236 extend away from the connecting part 234 and the centre of the ring-shape defined by the seal 230. The outside edges of both the upper and lower parts 232, 236 preferably form a right angle with the connecting piece 234 where the seal 230 is not fitted to the bowl assembly 100. The upper part 232 is characterised in that it is longer and thicker in profile than the lower part 236.

Preferably, the upper part 232 is as thick, or thicker, than the connecting part 234. The lower part 236 preferably becomes thinner as it extends away from the connecting part 234, so as to be arranged to easily deflect. Preferably, the seal 230 is made of a food-safe material which can be safely washed in a dishwasher—examples of suitable materials are rubber, silicone rubber, synthetic rubber (such as neoprene or Viton™), and thermoplastic elastomer.

The inner lid 220 comprises a substantially flat plate 222, which may optionally have a central aperture 221 to allow for the use of other food processing tools inserted therethrough or to allow food items to be added, a number of blades 224 located on the underside of the plate to assist in mixing of food items, and a side wall 225 having upper and lower protruding sections 226, 227 forming a groove in which the seal 230 may fit. The blades 224 may extend all the way to the aperture 221, or only extend proximate to it. The substantially flat plate 22 can be formed of a transparent material such as glass or Tritan™ to permit visual monitoring of the interior of the bowl 110. The central aperture 221 may be provided with a wall 223 extending downwardly towards the bottom of the bowl 110 for guiding foodstuffs into the centre of the bowl. The central aperture 221 may, optionally, be provided with a removable cap 240 to cover the aperture when it is not in use. The removable cap 240 may include locking and/or sealing elements to allow the interior of the bowl to be pressurised and/or depressurised.

A further side wall 228 is arranged to extend away from the plate 222 from the end of the lower protruding section 227, so as to protrude beneath the seal 230 when it is fitted to the inner lid 220. The upper protruding section 226 is arranged to have the same length as the upper part 232 of the seal 230 such that the upper part 232 fits against and is supported by the upper protruding section 226, as well as the inner lid side wall 225. The lower protruding section 227 is short in length so as to leave most of the lower part 236 of the seal 230 unsupported, and to allow the seal 230 to be easily fitted into the groove. The seal 230 is fitted to the inner lid 200 using a stretch fit so as to fit tightly against the lid.

The outer lid 210 comprises an annular plate 212 having overhanging inner and outer walls 214, 216 to receive the inner lid 220. Preferably, the outer lid 210 further comprises a plurality of handle top pieces 218 extending out from the outer wall 216, which are arranged to fit on top of a corresponding part of the handle assemblies 130 arranged on the bowl 110. The outer wall 216 further comprises a plurality of extended portions 217. The extended portions 217 extend further towards away from the plate 212 than the remainder of the outer wall 216, and are located away from the handle top pieces 218, so as to provide fittings for engaging with the wall of the bowl.

The inner wall 214 is arranged to abut the plate 222 of the inner lid 220, such that the annular plate 212 fits over the upper protruding section 226. The groove of the inner lid 220 holding the seal 230 is thereby contained partially between the outer and inner walls 214, 216. The seal 230 is surrounded on three sides by the inner lid side wall 225, the upper protruding section 226 of the side wall 225, and the outer wall 216 of the outer lid 210, allowing an effective seal to be formed with the lip 112 while advantageously allowing the seal 230 to be easily removed when the lid assembly 200 is disassembled.

Figure 4A:
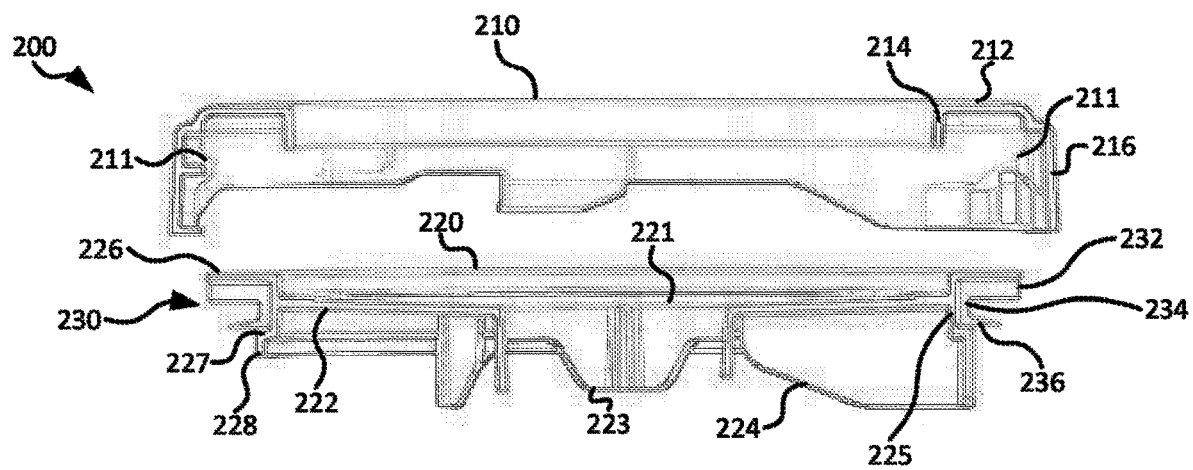
FIG. 4a shows a cross-section of separated outer and inner lids of the kitchen appliance.
Figure 4B:
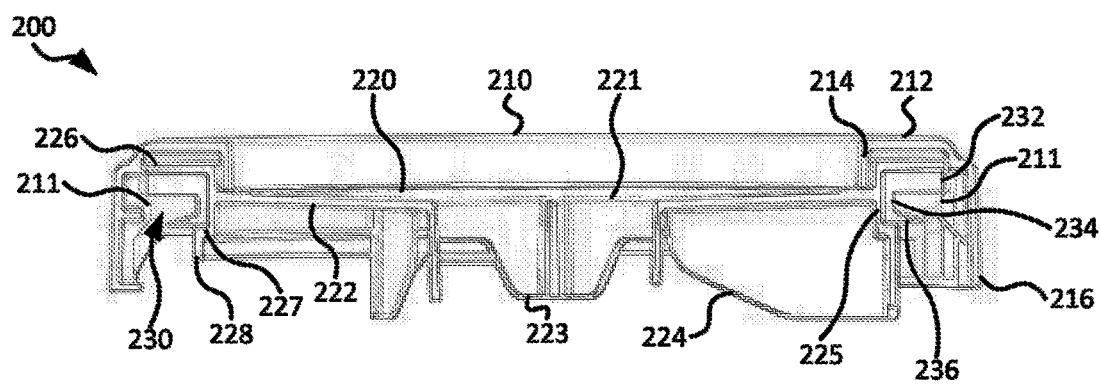
FIG. 4b shows a cross-section of the assembled lid assembly.

FIG. 4a shows a cross-section of the separated outer and inner lids 210, 220. FIG. 4b shows a cross-section of the assembled lid assembly 200. The outer wall 216 of the outer lid 210 may comprise one or more retaining features 211 for holding the inner lid 220 in place. Preferably, the retaining features 211 allow the inner lid 220 to rotate relative to the outer lid 210. The retaining features 211 may comprise inwardly extending spurs being located outwardly from the seal 230, for example. To fit or remove the inner lid 220, the inner lid 220 is pressed past the retaining features 211 in a snap-fit or a press-fit.

Figure 5:
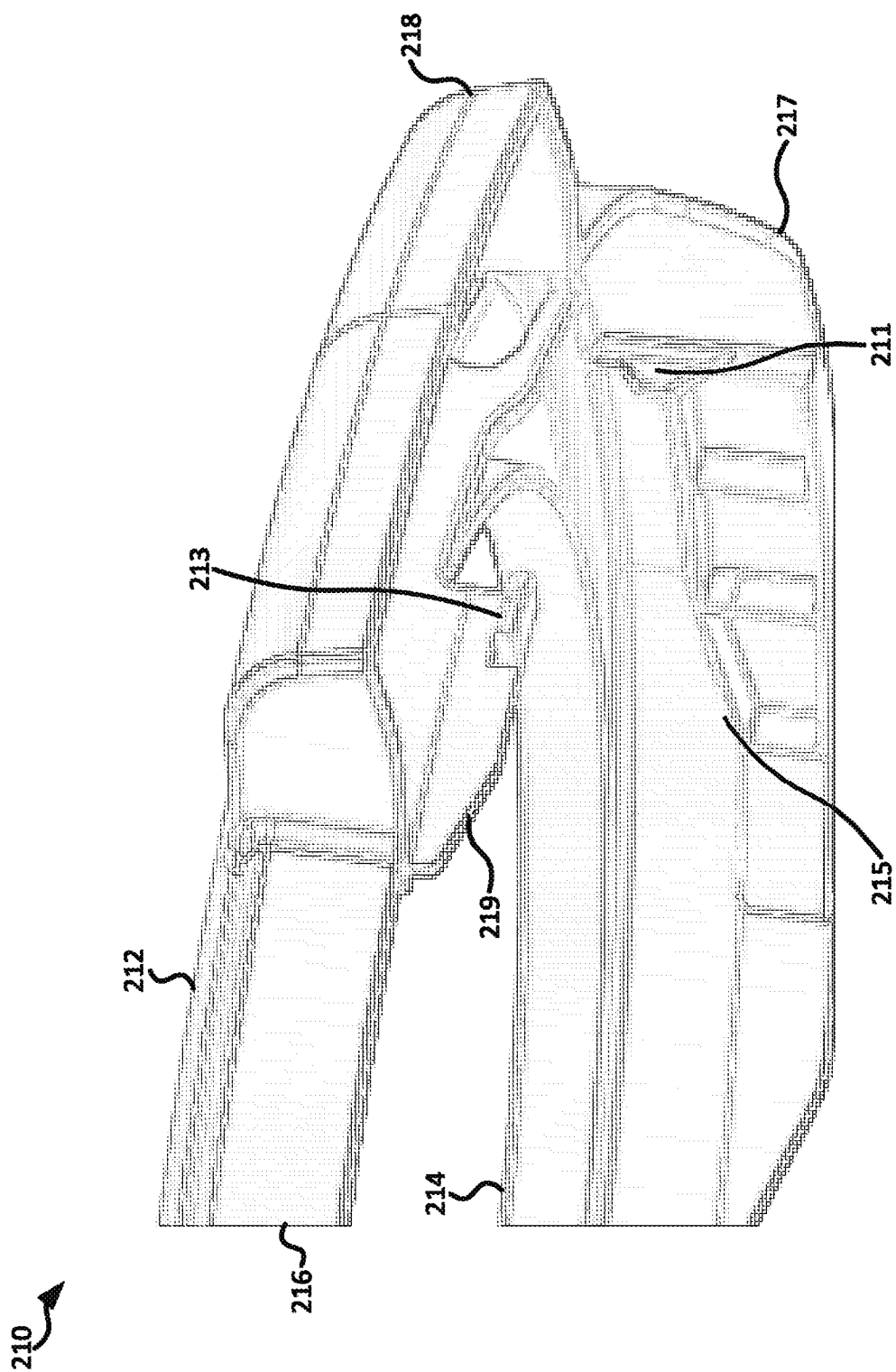
FIG. 5 shows a detailed view of a section of the outer lid.

FIG. 5 shows a detailed view of a section of the outer lid 210. The outer lid 210 comprises a plurality of features arranged to engage with corresponding features on the bowl assembly 100 to allow the lid assembly 200 to be securely fitted to the bowl assembly 100. A twist-fit connection may be used, such that the lid assembly 200 is rotated with respect to the bowl assembly 100 to tighten the connection. A plurality of bayonet tabs 213 are provided on small extensions 219 of the outer wall 216. The extensions 219 are located underneath the handle sections 218, and the bayonet tabs extend outwardly away from the centre of the outer lid 210. The bayonet tabs 213 are arranged to engage with cooperating apertures 133 provided inside the handle assembly 130.

In addition, a plurality of projections 215 forming ramp shapes may be provided on the extended portion 217 of the outer wall 216, extending inwardly towards the centre of the lid assembly 200. These projections 215 are arranged to engage with corresponding projections 114 provided on the lip 112 and extending outwardly from the bowl 110, so as to cause the lid assembly 200 to be driven towards the bottom of the bowl assembly 100 when rotated, urging the seal 230 against the lip 112. Preferably, only the outside lid 210 rotates relative to the bowl assembly 100, which allows the lid assembly 200 to be fitted to the bowl assembly 100 within being resisted by friction between the seal 230 the lip 112 of the bowl 110.

Figure 6:
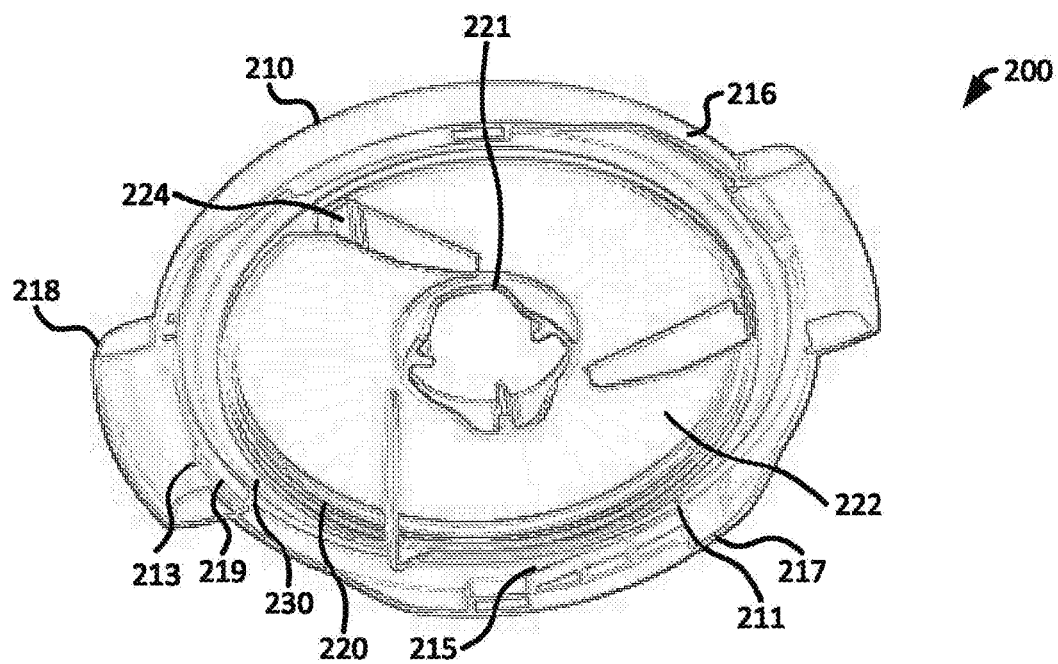
FIG. 6 shows the separated lid assembly and a bowl assembly with features allowing the components to engage being visible.
Figure 6:
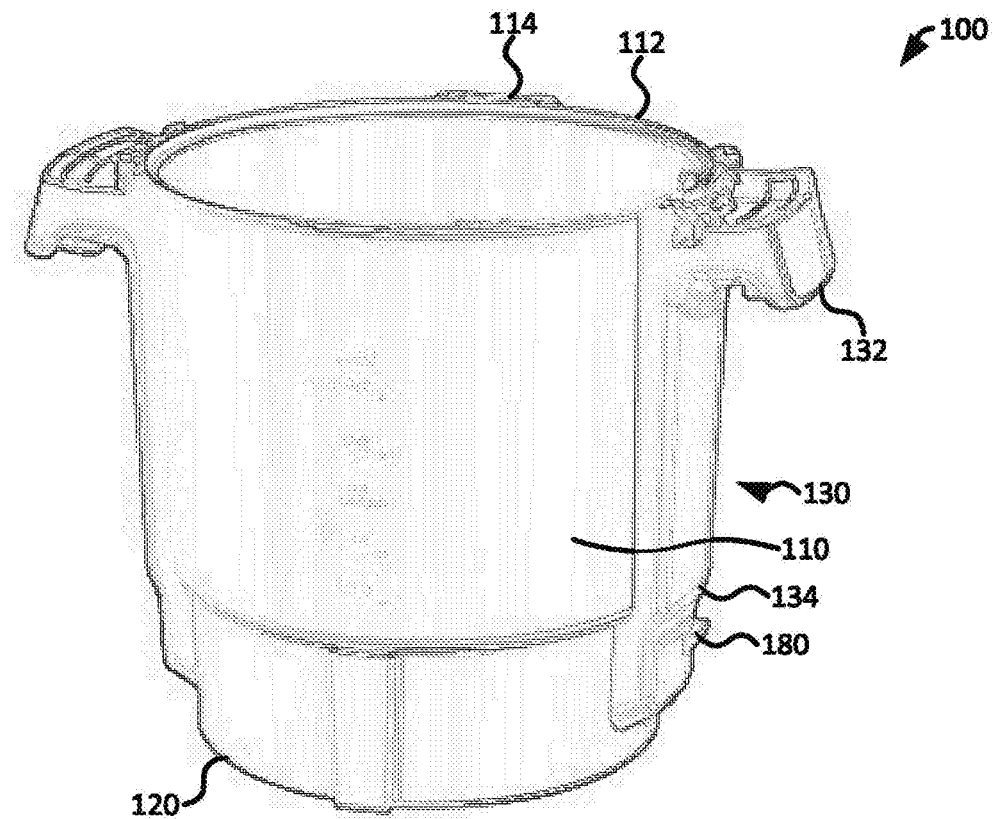
Figure 7A:
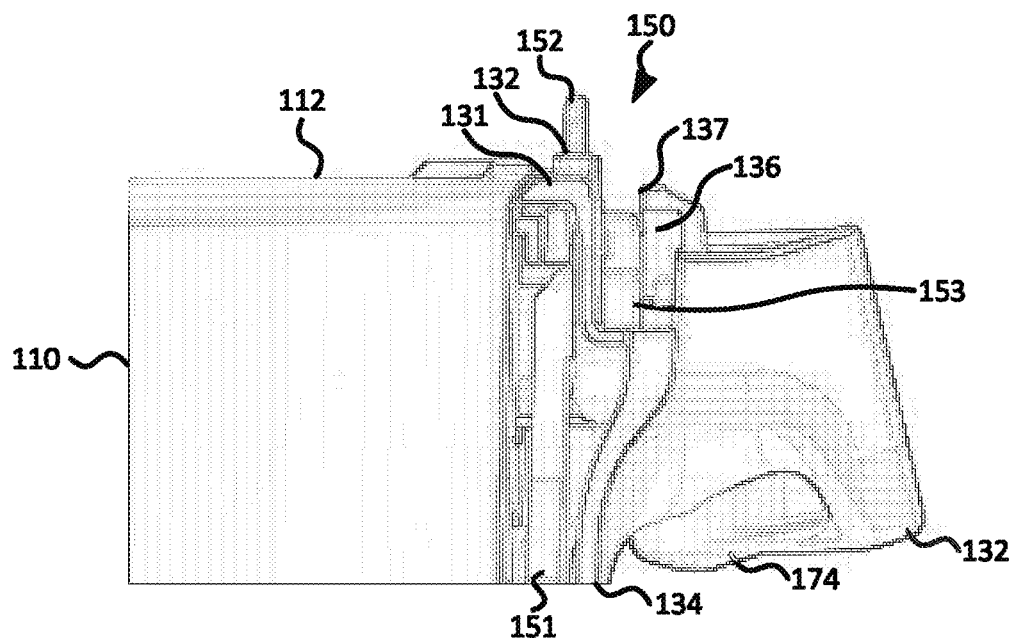
FIG. 7a shows a cross-section of the top part of the bowl assembly where an interlock mechanism is shown in a closed position.

FIG. 6 shows the separated lid assembly 200 and bowl assembly 100 with features allowing the components to engage being visible. FIG. 7a shows a cross-section of the top part of the bowl assembly 100 where a safety device or interlock mechanism 150 is shown in a closed position.

The compartment 134 houses part of a safety device comprising an interlock mechanism 150 arranged to prevent the kitchen appliance 1 activating without both the lid assembly 200 being in place and a seal 230 being fitted to the inner lid 220.

Preferably, the kitchen appliance comprises two interlock mechanisms 150, both being contained in one of the two handle assemblies 130. The interlock mechanism 150 comprises one or more movable members, where a first member 151 is arranged to extend along the side of the bowl assembly 100 parallel to the compartment 134. The first member 151 is biased away from the bottom of the bowl, which may due to the upward urging of at least one spring 156, with the urging being resisted at a first end by a top part 131 of the handle assembly 130.

The first end of the first member 151 is provided with a tab 152 being located on an outer face of the first member 151 and extending parallel to the first member 151. The first member 151 further comprises a spur 153 extending perpendicularly away from the first member 151. The spur 153 is located on the part of the tab 152 that does not extend beyond the first end of the first member 151.

The tab 152 may protrude through an aperture 132 provided on the top part 131 of the handle assembly 130, adjacent the lip 112. The handle assembly 130 also comprises a cavity 136 located outward of the aperture 132 (with respect to the centre of the bowl 110) having an opening 137. The spur 153 may protrude into the cavity 136, as shown in FIG. 7a. The cavity 136 is arranged to receive the extension 219 of the outer lid 210 having the bayonet tab 213, with the width of the extensions 219 fitting through the opening 137. The cavity 136 provides access to the aperture 133 (not visible in FIG. 7a) which is arranged to engage with the cooperating bayonet tab 213 on the lid assembly 200.

The opening 137 may be arranged to be of variable/varying width along its length so as to be too narrow to fit the bayonet tab 213 proximate the aperture 133 but wide enough to fit the bayonet tab 213 away from the aperture 133. This means that to fit the lid assembly 200 to the bowl assembly 100, the bayonet tab 213 must be inserted into the cavity 136 away from the aperture 133 and then be rotated into place to engage the bayonet tab 213 with the aperture 133 and thereby fit the lid assembly 200 to the bowl assembly 100.

As shown in FIG. 7a, where the lid assembly 200 is not attached, the first member 151 is biased upwardly into a first position such that the tab 152 protrudes out of the aperture 132 and the spur 153 is located towards the top of the cavity 136, blocking the aperture 133 and thereby preventing the lid assembly 200 from being rotated to a locked position.

Figure 7B:
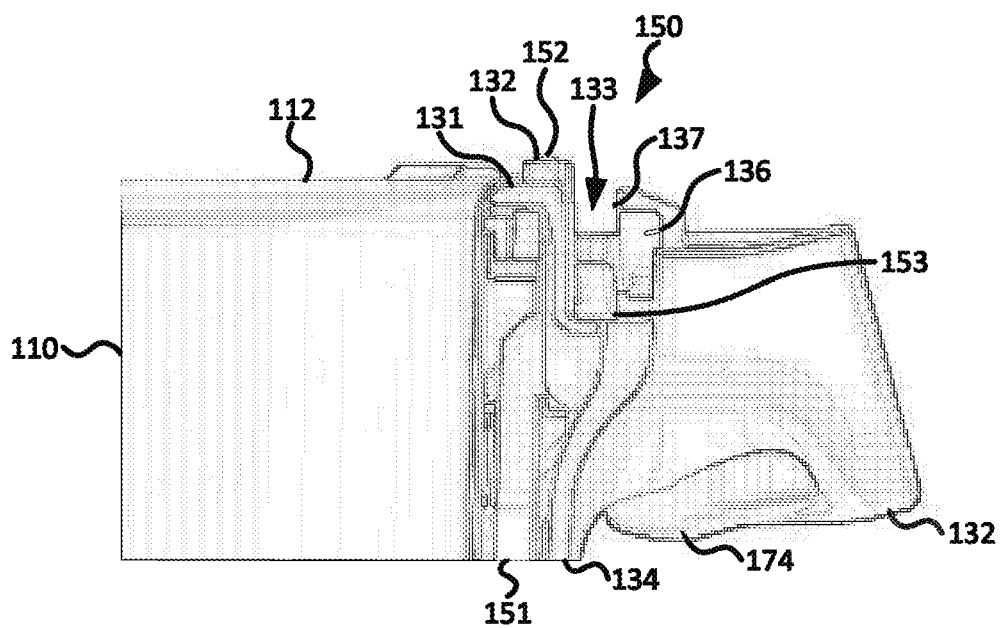
FIG. 7b shows a cross-section of the top part of the bowl assembly where an interlock mechanism is shown in an open position.

FIG. 7b shows a cross-section of the top part of the bowl assembly 100 where an interlock mechanism 150 is shown in an open position. When the tab 152 is depressed towards a second position so as to not extend out of the aperture 132, the spur 153 is also depressed and the aperture 133 is made accessible from the cavity 136, allowing the lid to be rotated to a locked position.

Figure 8A:
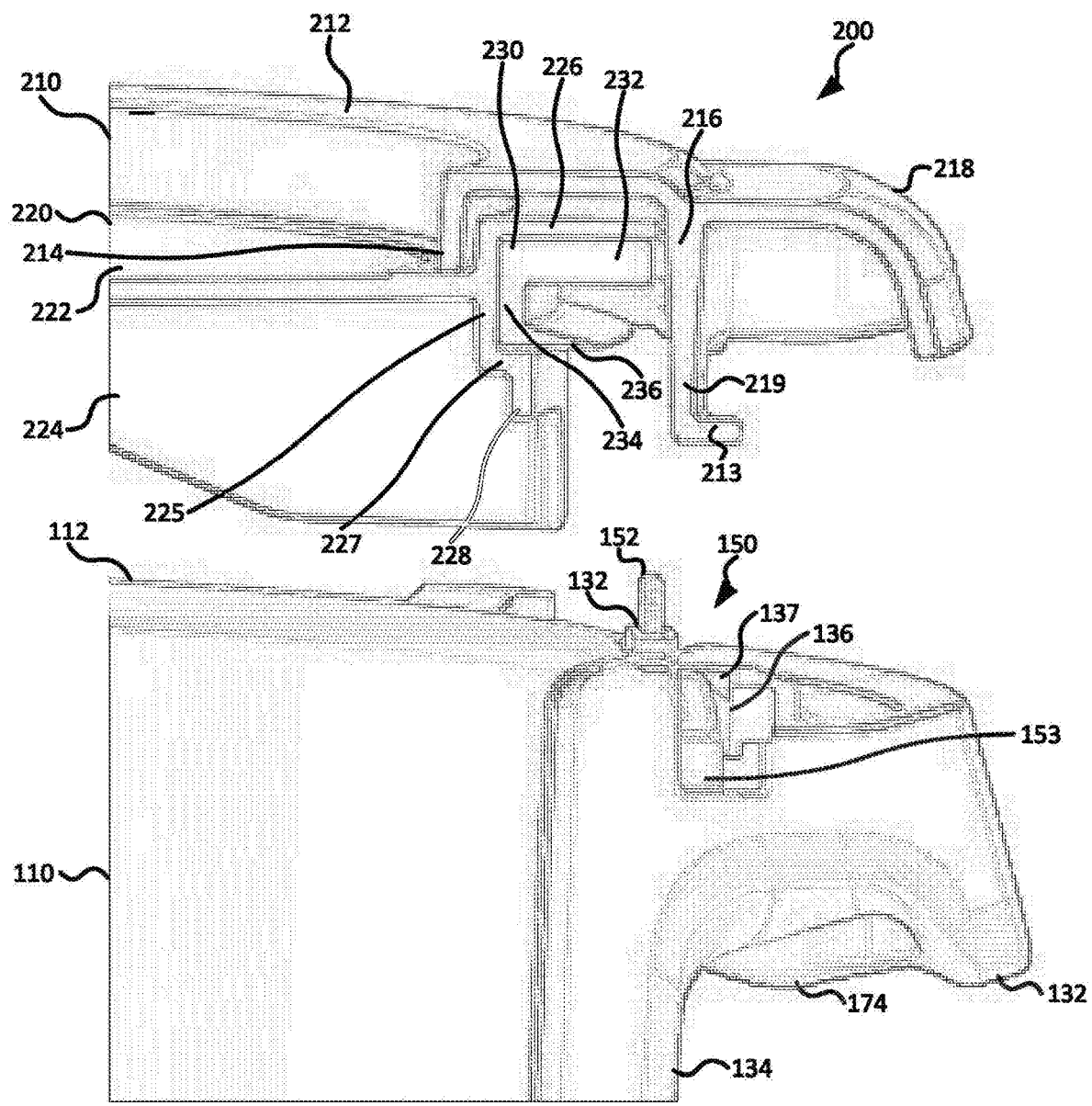
FIG. 8a shows a cross-section of the lid assembly and a top part of the bowl where the components are separated.
Figure 8B:
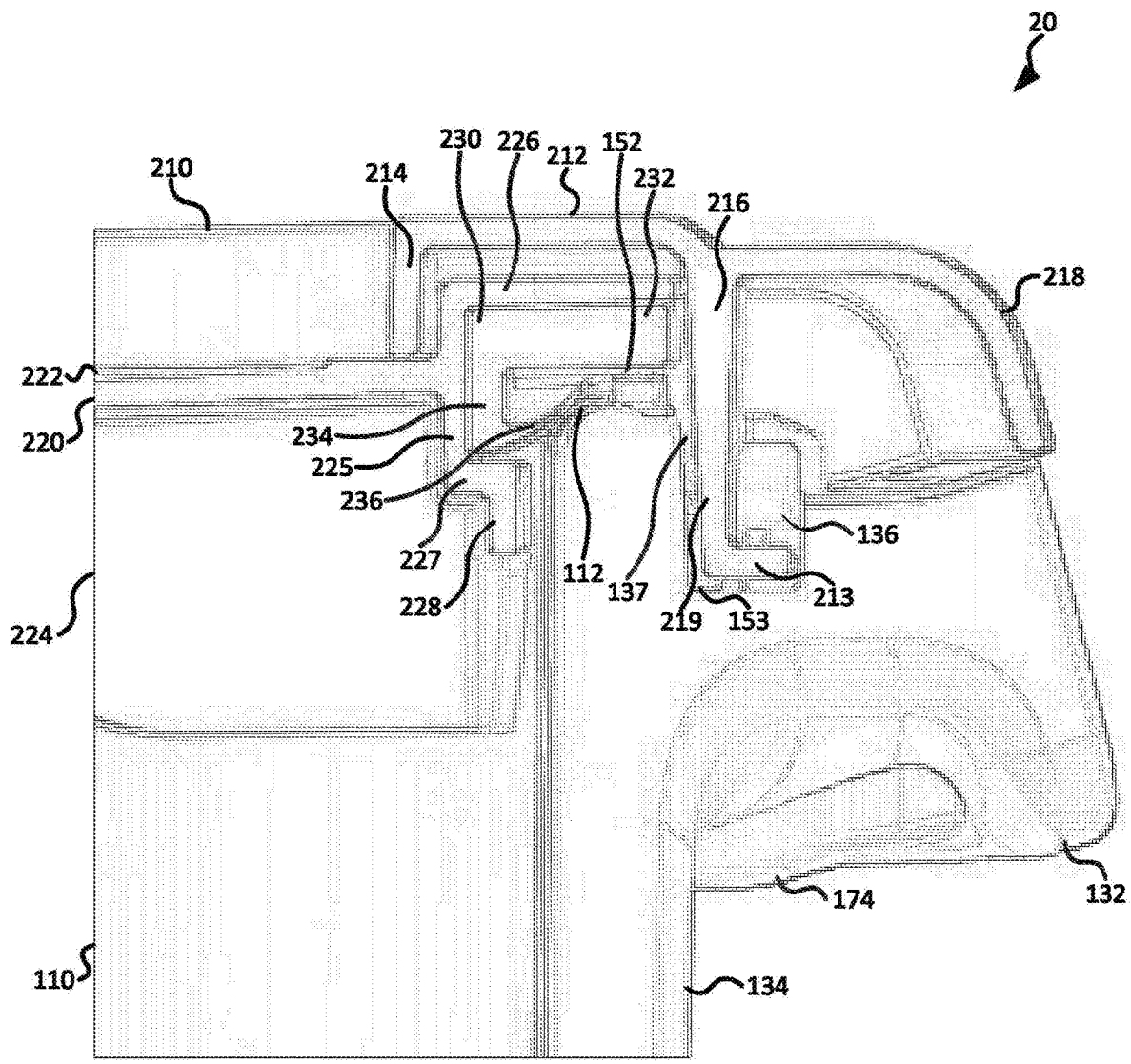
FIG. 8b shows a cross-section of the lid assembly and the a part of the bowl where the components are fitted together.

FIG. 8a shows a cross-section of the lid assembly 200 and the top part of the bowl assembly 100 where the components are separated. FIG. 8b shows a cross-section of the lid assembly 200 and the top part of the bowl assembly 100 where the components are fitted together. As FIG. 8b shows, when the lid assembly 200 is fitted onto the bowl assembly 100 the tab 152 is depressed by the upper part 232 of the seal 230, which lowers the spur 153, thus opening the aperture 133 and allowing the lid assembly 200 to be rotated so as to allow the bayonet tab 213 to engage with the aperture 133. As the upper part 232 of the seal 230 is relatively thick compared to the lower part 236, and supported by the partially-surrounding upper protruding section 226 and inner lid side wall 225, it is not substantially upwardly-deflected by the tab 152 but instead pushes it down. The lid assembly 200 may then be rotated into a locked position with respect to the bowl assembly 100. Where the lid assembly 200 is in a locked position, the lower part 236 of the seal 230 is deflected upwardly by the lip 112 to form a seal between the lid assembly 200 and the bowl assembly 100.

Figure 9:
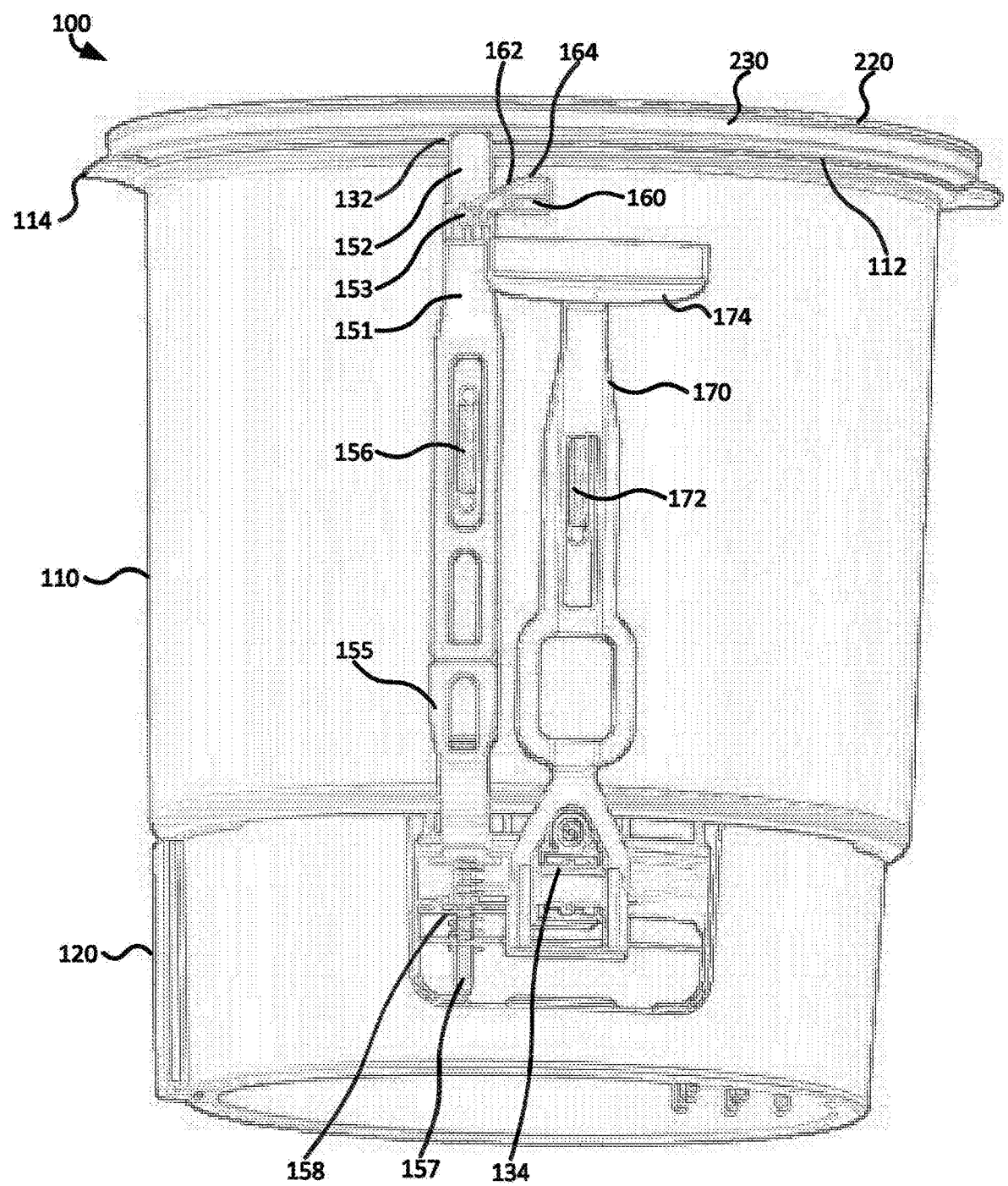
FIG. 9 shows a schematic view of the bowl-lid assembly with a handle and the outer lid not being visible.

FIG. 9 shows a schematic view of the bowl-lid assembly 20 with the handle assembly 130 and the outer lid 210 not being visible. A latching member 170 is provided adjacent the first member 151, extending parallel to the first member 151 between a button 174 provided at its first end to the latch 180 at its second end. The latching member 170 is provided with a biasing spring 172. The operation of the latching member 170 will be described in greater detail later on.

The first member 151 is shown in a partially depressed position, with the tab 152 being depressed by the seal 230. The first member 151 is urged towards the seal 230 by the spring 156, which is attached to the bowl 110 in a cut-out section of the first member 151.

The first member 151 further comprises an arm 160 extending away from the side of the first end of the first member 151, perpendicularly to the spar 153. The arm 160 is arranged to act as a cam for depressing the first member 151 as the lid assembly 200 is rotated. The bottom surface of the arm 160 extends perpendicularly away from the first member 151. The top surface of the arm 160 extends away from the first member 151 diagonally, so the arm 160 extends above the first end of the first member 151 and a ramp-shaped section 162 is defined by the arm 160. The top surface of the arm 160 comprises a flat section 164 at an end of the arm 160 away from the first member 151.

A second end of the first member 151 is attached to a first end of a second member 155. The second member 155 extends beyond the bottom of the bowl 110, and is contoured at the interface between the bowl 110 and the base section 120 to match the smaller diameter of the base section 120. A plunger 157 is provided on a second end of the second member 155, said plunger 157 extending proximate the bottom surface of the compartment 134. The plunger 157 preferably has a circular cross-section and may be biased upward by the action of a further spring 158. Alternatively, the second member 155 may not be used, with the first member 151 being extended to take the place of the second member 155 and the plunger 157 being located instead on the second end of the first member 151.

Figure 10:
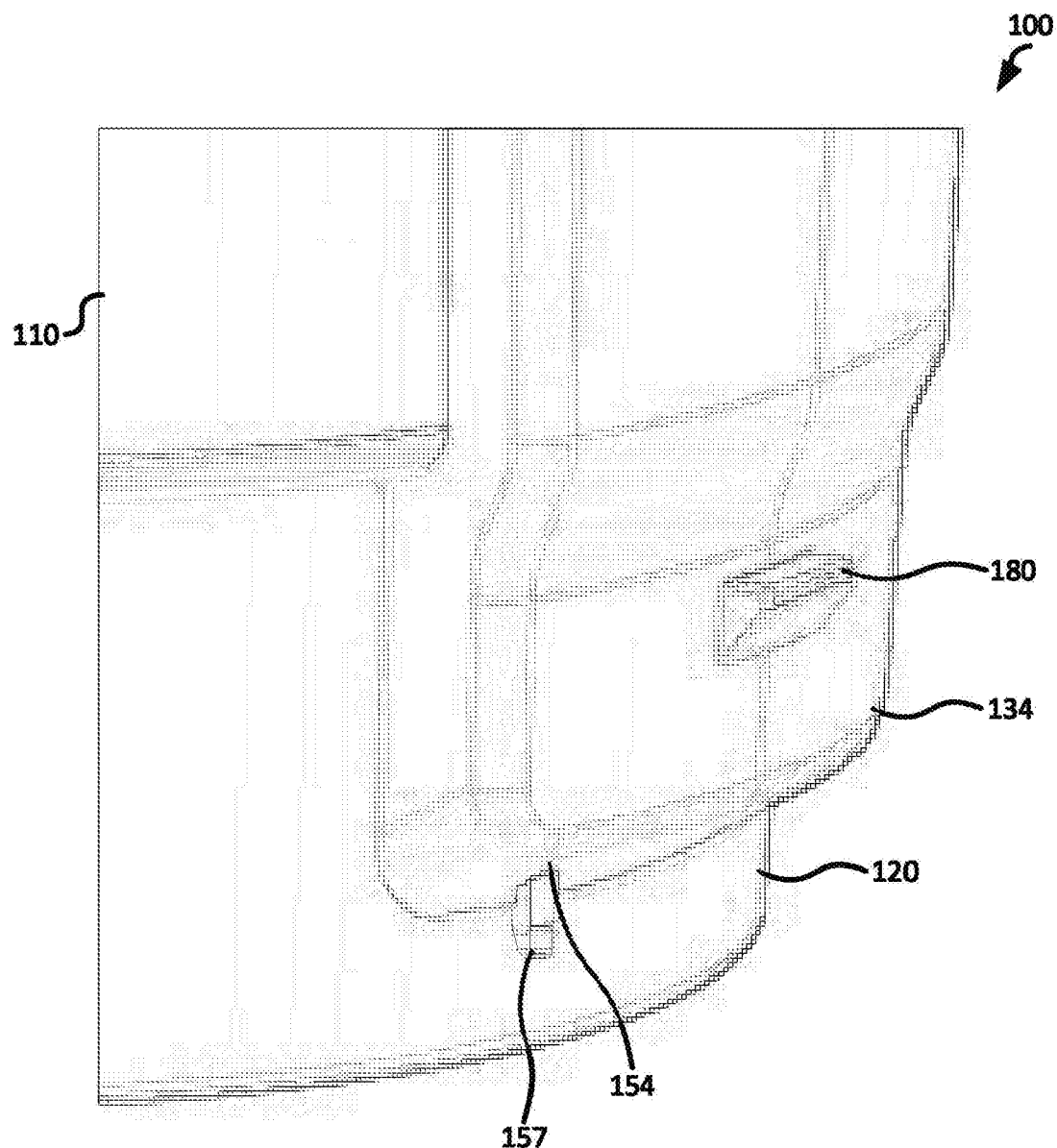
FIG. 10 shows a tab extending out of the bowl.

FIG. 10 shows the plunger 157 extending out of the bowl assembly 100. Where the first member 151 is fully depressed, the plunger 157 extends through the aperture 154 provided in a bottom surface of the compartment 134. The length of the first and second members 151, 155, the plunger 157, and the tab 152 is arranged such that the initial depression of the tab 152 by the seal 230 is not sufficient to cause the plunger 157 to extend any more than a small distance out of the aperture 154. The extension of the plunger 157 out of the aperture 154 acts to engage the interlock mechanism 150, as will be described later on.

Figure 11A:
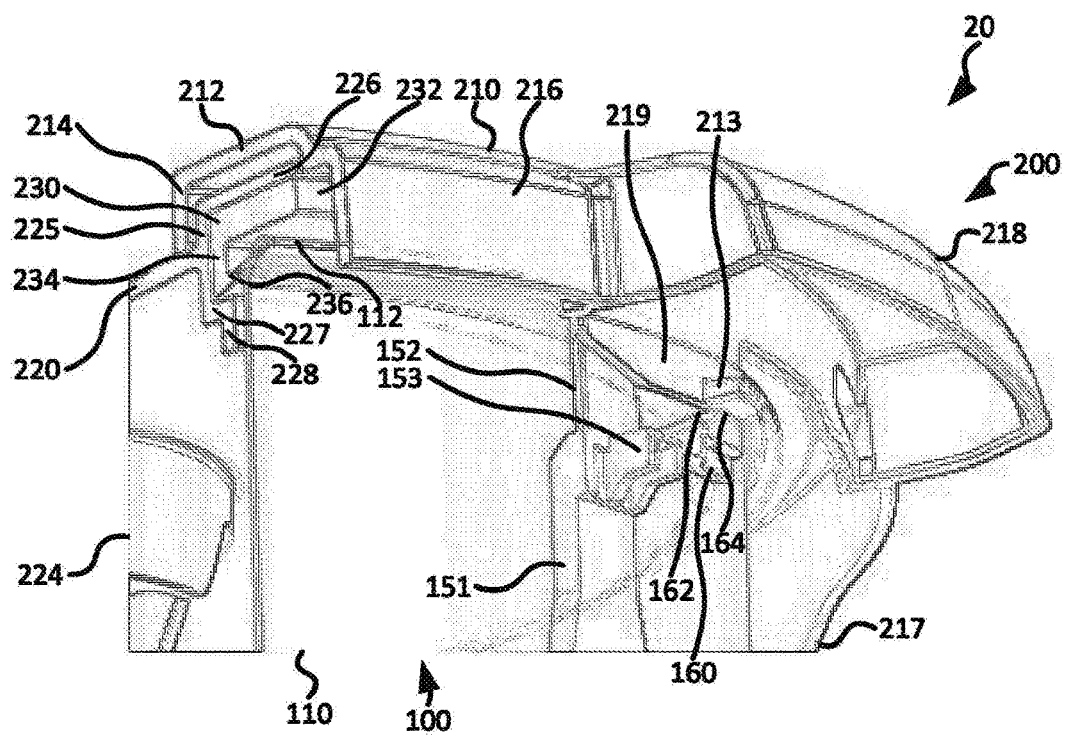
FIG. 11a shows a cross-section of the lid-bowl assembly where the lid assembly and seal are fitted to the bowl assembly.

FIG. 11a shows a cross-section of the lid-bowl assembly 20 where the lid assembly 200 and seal 230 are fitted to the bowl assembly 100. The first member 151 is shown in a second (fully depressed) position. Following the initial depression of the tab 152 (not visible in FIG. 11a) by the seal 230, the lid assembly 200 may be rotated so as to engage the bayonet tab 213 with the aperture 133 (not visible in FIG. 11a). This action locks the lid assembly 200 onto the bowl assembly 100. In rotation, the edge of the projection 219 on which the bayonet tab 213 is mounted rides the ramp-shaped section 162 of the arm 160. This causes the first member 151 to be driven further downwards, causing the plunger 157 to extend out of the aperture 154. Further rotation of the lid assembly 200 towards the end of the aperture 133 causes the edge of the projection 219 to ride onto the flat section 164 of the arm 160, stopping the first member 151 in the second position.

Figure 11B:
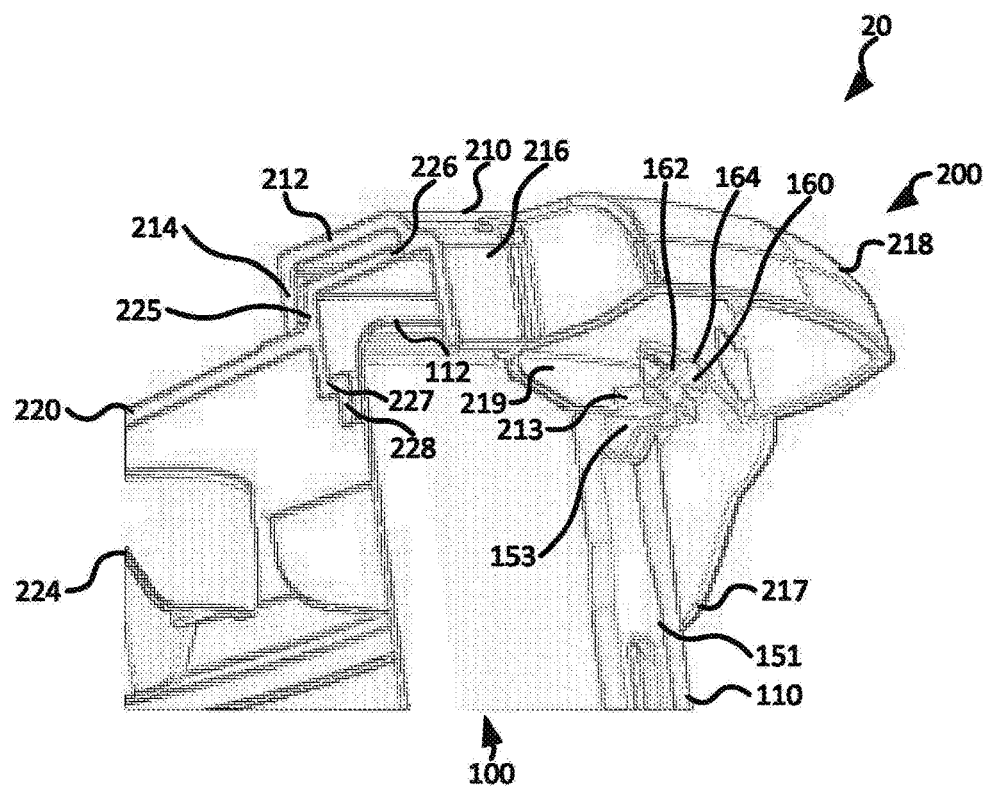
FIG. 11b shows a cross-section of the lid-bowl assembly where the seal is not fitted.

FIG. 11b shows a cross-section of the lid-bowl assembly 20 where the seal 230 is not fitted. The first member 151 is shown in a first position in which it is fully raised, because the lack of the seal 230 means the tab 152 is not depressed. The bayonet tab 213 is shown abutting the spar 153. The bayonet tab 213 cannot be rotated into the cooperating aperture 133 due to the raised position of the spar 153, so the lid assembly 200 cannot be locked to the bowl assembly 100 and furthermore the plunger 157 does not fully extend, so the interlock mechanism 150 cannot be engaged. It is not possible to depress the tab 152 where the lid assembly 200 is fitted without the seal 230 (for example, using a part of the lid assembly 200) because the tab 152 extends into an enclosed gap where the seal 230 would otherwise be, so the interlock mechanism 150 cannot be activated without the presence of the seal 230.

In addition, the interlock mechanism 150 cannot be engaged merely by depressing the tab 152 without the lid assembly 200 being fitted, because the first member 151 must be fully depressed into the second position by the interaction between the projection 219 and the arm 160 as the lid assembly 200 is rotated. It is thereby required that both the seal 230 is correctly fitted to the lid assembly 200 and the lid assembly 200 is locked to the bowl assembly for the interlock mechanism 150 to be engaged. It will be appreciated that the interlock mechanism is a two-stage interlock, in that it first requires the tab 152 to be depressed by the seal 230 and then that the arm 160 is depressed by the rotation of the lid assembly 200.

Figure 12B:
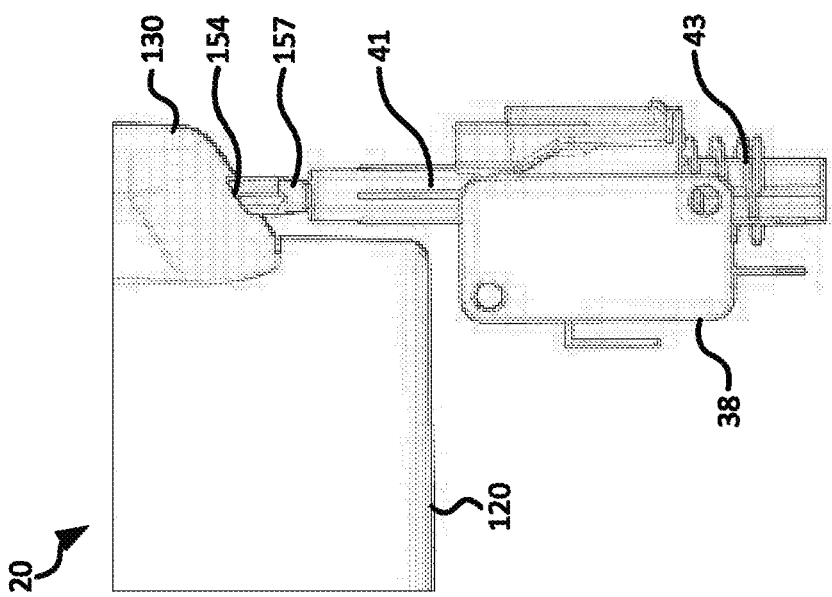
FIG. 12b shows the switch in an 'on' position.
Figure 12A:
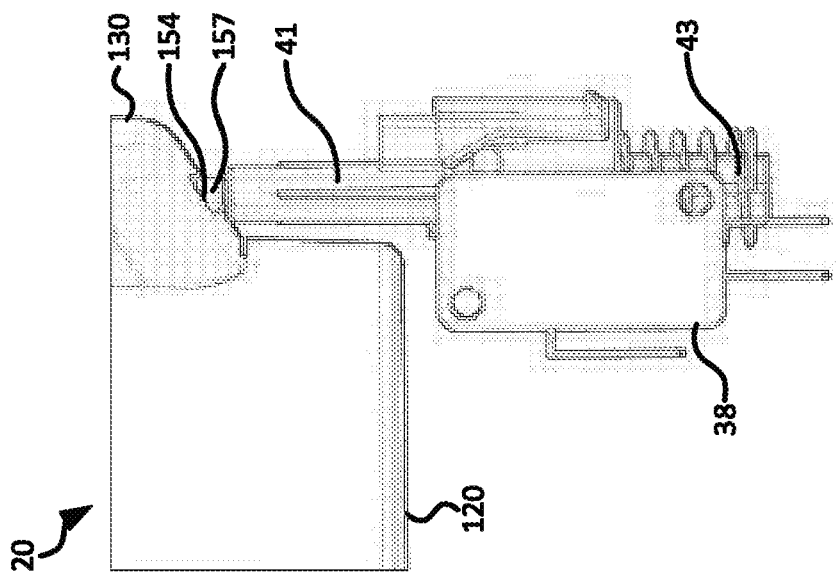
FIG. 12a shows a switch of the kitchen appliance in an 'off' position.

FIG. 12a shows the switch 38 in an 'off' position. FIG. 12b shows the switch 38 in an 'on' position. When the first member 151 is fully depressed and the lid-bowl assembly 20 is fitted to the base unit 30, the plunger 157 extends through the apertures 154, 36 (aperture 36 is not shown in FIGS. 13a and 13b) and depresses a member 41 provided within the aperture 36. The member 41 is shaped so as to close the electrical contacts of the switch 38 as the member 41 is depressed, turning the switch 38 to an 'on' position. This engages the interlock mechanism 150 and allows the kitchen appliance 1 to fully operate. The member 41 is biased upwardly by a spring 43 and the electrical contacts of the switch 38 are biased to open, so the switch 38 will return to the 'off' position when the plunger 157 is removed, either by removal of the lid assembly 200 from the bowl assembly 100 or from the bowl-lid assembly 20 being removed from the base unit 30.

Figure 13B:
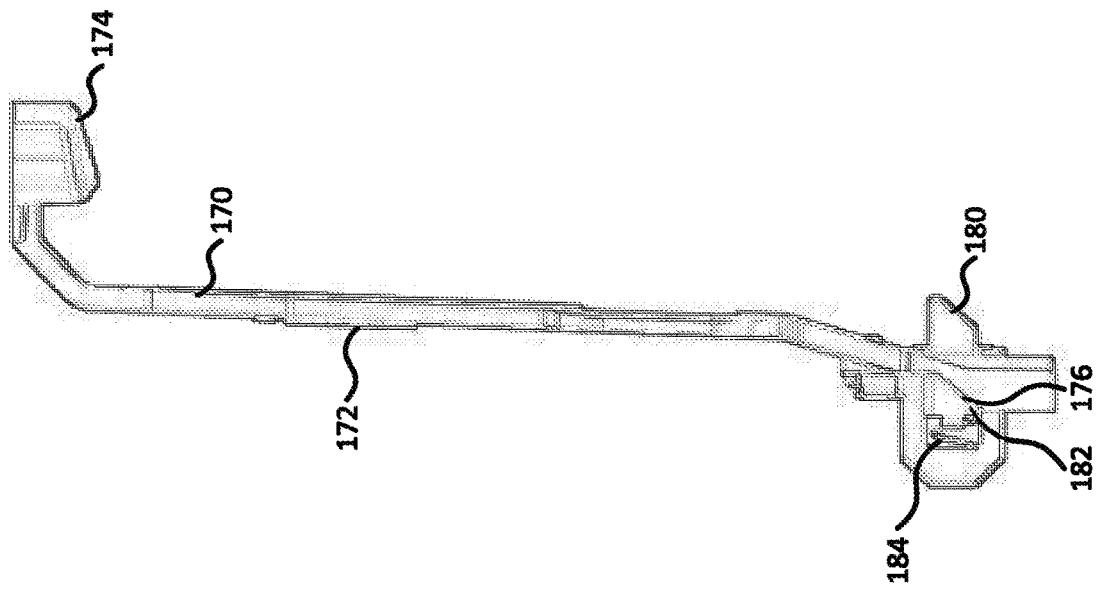
FIG. 13b shows a latching member on its own.
Figure 13A:
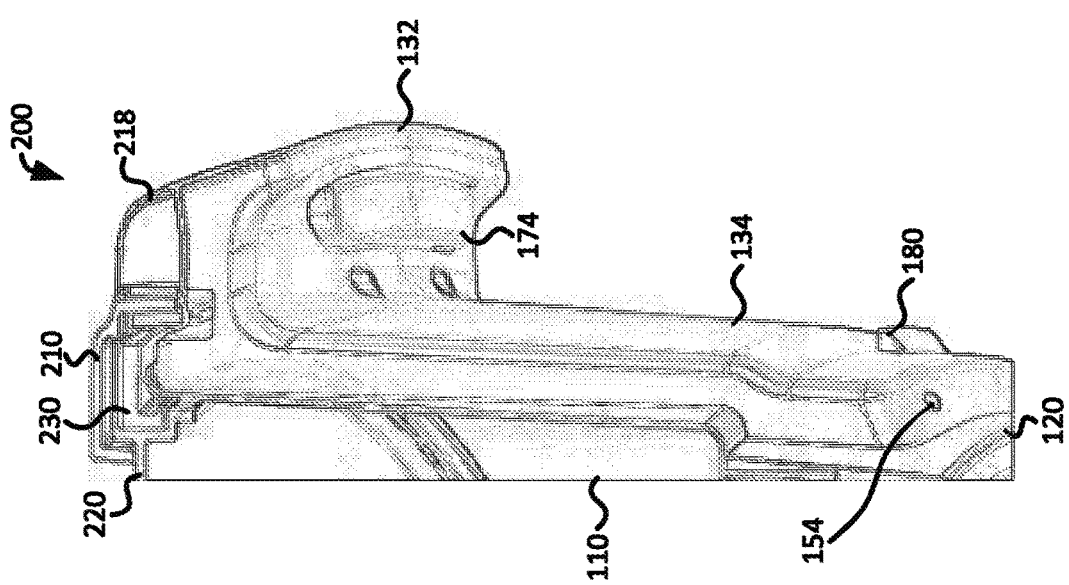
FIG. 13a shows a cross-section of the lid-bowl assembly showing a latching mechanism of the kitchen appliance.

FIG. 13a shows a cross-section of the lid-bowl assembly 20 showing the latching mechanism. FIG. 13b shows the latching member 170 on its own. As mentioned, the latching member 170 is arranged to extend between the button 174 and the latch 180. The button 174 is arranged to protrude out of the underside of the handhold 132 and the latch 180 protrudes out of the side of the compartment 134. The button 174 is attached to the first end of the latching member 170 and is arranged so as to be easily located and depressed by a user.

The second end of the latching member 170 engages with the latch 180 by means of a surface 176 provided proximate the second end, where the surface 176 is angled with respect to the base of the bowl 110 and is arranged to slide relative to a corresponding surface 182 provided on the latch 180. The latching member 170 is provided with a return spring 172 to bias the latching member 170 towards the bottom of the bowl 110, and the latch 180 may be provided with a further return spring 184 to bias the latch 180 outwardly from the bowl assembly 100.

Where the user lifts the bowl-lid assembly 20 using the handhold 132, the button 174 will be depressed into the handhold 132. This causes the latching member 170 to move vertically and causes the latch 180 to move horizontally and retract into the compartment 134 as a result of the interaction between the sliding surfaces 176, 182. The latch 180 is thereby disengaged from the recess 34 and the bowl-lid assembly can be lifted out of the cavity 32. This mechanism allows the bowl-lid assembly 20 to be easily disengaged from the base unit 30 when required.

It will be appreciated that the fit of a removable seal 230 between a lid assembly 200 and a bowl assembly 200 could be achieved using a variety of alternative configurations. For example, the lid assembly 200 may consist of a single piece rather than separate inner and outer lid components 210, 220. The lid assembly 200 may comprise a removable component arranged to support the seal 230 without forming a closure with the bowl, in place of or in addition to the inner lid component 220. The seal 230 could be removably attached to the bowl 110, rather than in the lid assembly 200.

Alternatively, the seal may be attached to the appliance, rather than being a removable component. In this case, the mechanism serves to ensure the appliance operates only when the seal has been properly attached during assembly, and/or has not become detached subsequently, for example during use of the appliance.

The interlock mechanism 150 may use one or more linkages instead of springs to return the mechanism to a normal position. The aperture 133 provided in the cavity 136 may alternatively be opened by the seal 230 being pressed against a separate moving part other than a part of the first member 151. The interlock mechanism may alternatively be incorporated in the wall of the bowl assembly 100 or in the base unit 30 rather than in the handle assembly 130. An alternative fit other than a twist-fit/bayonet fit could be used to attach the lid assembly to the base assembly, while still using a similar interlock mechanism in which a member 151 is depressed to actuate a switch 38. For example, a snap-fit between the lid assembly 200 and bowl assembly 100 could be used. Only one interlock mechanism 150, or alternatively more than two interlock mechanisms 150, could be provided as part of the kitchen appliance 1 as an alternative. The interlock mechanism 150 may also incorporate more than two interlock stages.

The first or second member 151, 155 provided as part of the interlock mechanism 150 may, optionally, comprise an indicator, such as a red and green coloured display element, which may be displayed to the user via a panel made of a transparent material provided in the handle. The appropriate part of the indicator may be shown to the user or obscured to indicate the status of the interlock based on the position of the first or second member 151, 155.

The status of the interlock mechanism 150 may, optionally, be monitored by sensors, which may be provided on components of the interlock mechanism 150 or within the lid assembly 200 or bowl assembly 100. The interlock status may be indicated to the user on a user interface and/or warning light provided on the bowl assembly 100 or the base unit 30. Alternatively or additionally, the interlock status may be transmitted using transmitters provided in the base unit 30, the lid assembly 200, or the bowl assembly 100 to an external server or to a mobile device. Interlock status information may be forwarded to other devices with which the kitchen appliance 1 is co-operating to complete a task, so that these other devices may also delay/cease processing.

Devices to which interlock status information may be forwarded may for example include a robot which may act to properly attach the seal 230 and/or lid assembly 200 upon receiving information indicated that the seal 230 and/or lid assembly 200 are not properly attached. The user may additionally be notified as to the interlock status via sounds or vibrations emitted by the base unit 30, the lid assembly 200, or the bowl assembly 100.

The interior of bowl assembly 100 may optionally be configured to be pressurisable and/or depressurisable, either by the heating/cooling of material inside the bowl assembly, or through the action of a pump, or otherwise. The seal 230 may assist in maintaining the desired pressure within the bowl assembly 100, and a pressure-relief valve may be included, either in the lid assembly 200 or the bowl 110. In this case the bowl and lid construction are suitably strengthened to withstand the internal pressure.

A mechanically-actuated interlock is advantageous in that it is relatively cheap to manufacture and robust. However, in another embodiment of the invention, an electronically-actuated (i.e., directly sensing the seal electronically or magnetically) rather than a mechanically actuated interlock may be used. In this embodiment, the seal 230 further comprises a tag that is detectable by one or more sensors provided on the bowl assembly 100 and/or lid assembly 200. When the sensors detect that the seal 230 has been correctly fitted, a signal may be transmitted from the sensors to a controller provided in the base assembly 100 indicating that a heating element and/or a processing tool may be safely energised. RFID, NFC (or other wireless/radio frequency sensors), magnetically-actuated reed switches, or physical electrical contacts for which the seal or a tag completes an electrical circuit may be used as a communication means between the tag and the one or more sensors, for example. Electronically-actuated interlocks are advantageous in that they are versatile.

Mechanical and other improvements disclosed herein (such as the safety interlock mechanism) may find application in automotive and industrial fields, the field of tools including hand-tools, the plumbing field, the field of hydraulics, and are not limited in application to kitchen appliances.

It will be understood that the present invention has been described above purely by way of example, and modifications of detail can be made within the scope of the invention.

Each feature disclosed in the description, and (where appropriate) the claims and drawings may be provided independently or in any appropriate combination.

Reference numerals appearing in the claims are by way of illustration only and shall have no limiting effect on the scope of the claims.

The invention claimed is:

1. A kitchen appliance, comprising:
   a bowl;
   a lid arranged to be fittable to the bowl;
   a seal arranged to be fitted between the lid and the bowl when the lid is fitted to the bowl in which the seal is a removable component; and
   a safety device is configured to sense whether the seal component is fitted between the lid and the bowl and the safety device is arranged to allow operation of the kitchen appliance only when both the lid is fitted to the bowl and the seal is fitted between the lid and the bowl.

2. The kitchen appliance according to claim 1, in which the lid has a locked position on the bowl, and the safety device is arranged such that the lid is movable into the locked position only when the seal is fitted between the bowl and the lid.

3. The kitchen appliance according to claim 2, further comprising a base unit arranged to support the bowl, the safety device comprising a switch provided in the base unit, wherein the actuation of the switch allows the operation of the kitchen appliance.

4. The kitchen appliance according to claim 3, in which the safety device comprises a movable element biased towards a first position and movable towards a second position when the lid is fitted to the bowl and the seal is fitted between the bowl and the lid, the switch being actuable by movement of the movable element into the second position when the bowl is supported on the base unit.

5. The kitchen appliance according to claim 4, wherein the movable member is arranged to be moved to an intermediate position between the first and second positions when the seal and the lid are placed against the bowl, and wherein the movable member is arranged to be moved from the intermediate position to the second position when the lid is moved to the locked position.

6. The kitchen appliance according to claim 4, in which the movable member is an elongate member extending from a position at or adjacent a rim of the bowl to a position at or adjacent the base unit of the bowl.

7. The kitchen appliance according to claim 3, wherein the bowl comprises a latch arranged to latch the bowl with the base unit, such that the safety device is operable only when the bowl is latched to the base unit.

8. The kitchen appliance according to claim 7, comprising a button arranged to release the bowl from the base unit when the button is depressed, and wherein the bowl further comprises a handle, wherein the button is located on the handle.

9. The kitchen appliance according to claim 1, in which operation of the appliance comprises heating the bowl and/or moving a tool within the bowl.

10. The kitchen appliance according to claim 1, comprising a display element arranged to indicate the condition of the safety device.

11. The kitchen appliance according to claim 1, comprising:
    one or more sensors arranged to detect a condition of the safety device; and
    one or more transmitters arranged to transmit data relating to the condition of the safety device to an external server and/or user device.

* * * * *